United States Patent Office 3,431,306
Patented Mar. 4, 1969

3,431,306
HYDROXYBENZOPHENONES CONTAINING BETA-CHLORO- OR SULPHATOETHYLSULPHONYL GROUPS
Frank Samuel Henry Head, Mellor, near Stockport, and Gerald Lund, Manchester, England, assignors to The Cotton Silk and Man-Made Fibres Research Association, Didsbury, England
No Drawing. Filed Oct. 26, 1964, Ser. No. 406,599
Claims priority, application Great Britain, Oct. 26, 1963, 42,316/63
U.S. Cl. 260—591                11 Claims
Int. Cl. C07c 141/00; D06m 13/26

ABSTRACT OF THE DISCLOSURE

Benzophenone compounds of the formula

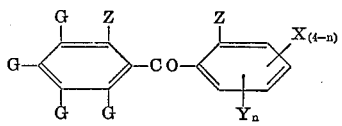

wherein Y is a group of the formula $$-SO_2CH_2CHA$$
$$\quad\quad\quad\quad |$$
$$\quad\quad\quad\quad E$$

and E is hydrogen or another substituent; A is a group which when combined with hydrogen forms an acid or a salt of a group which when combined with hydrogen forms an acid for example, halogen, sulphate ester or alkali metal salt of sulphate ester; $n$ is an integer; Z is hydroxyl, hydrogen or another substituent but at least one Z is hydroxyl; and X and G are hydrogen or another substituent, such as hydroxyl or alkoxy. These compounds are prepared by a Friedel-Crafts reaction between, for example,

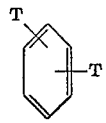

wherein T is hydroxyl, alkoxy or hydrogen and an acid halide of the formula

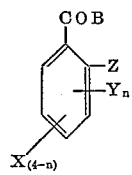

Use of the benzophenones as ultraviolet absorbers is disclosed.

---

The present invention relates to benzophenone derivatives and their production. It also relates to benzyl derivatives which can be used as intermediates in the production of said benzophenone derivatives, and to the production of said intermediates. In one particular aspect the present invention relates to the treatment of substrates having reactive hydrogen atoms, in particular cellulosic substrates, with ultra-violet absorbing compounds in order to protect the substrate against ultra-violet degradation thereof when exposed to the rays of the sun. Such protection is afforded by means of new ultra-violet absorbing compounds.

It is known to protect cellulosic fabrics, in particular cotton, against ultra-violet degradation on exposure to the sun by coating them with a synthetic resin. However this procedure is unsatisfactory in that it adds considerably to the weight of the finished fabric and completely alters the "feel or handle" of the material. This is especially true with very thin fabrics which also happen to be more susceptible to phototendering in sunlight and therefore lose their strength more rapidly than thick fabrics. Thus, cotton fabrics such as curtains, light weight tent materials and light awnings suffer greatly from the effect of ultra-violet light.

The present invention provides novel compounds which have the capacity for absorbing ultra-violet light and which when applied to the cloth form a linkage with the cellulose molecule and do not materially affect the appearance or feel of the cloth. The present invention also provides novel intermediates which can be used in the production of said novel compounds.

According to one embodiment of the present invention therefore there is provided an ultra-violet absorber which is a benzophenone compound in which there is at least one hydroxyl group ortho to the carbonyl group and which is also substituted on at least one, and preferably on only one, benzene ring by a sulphone grouping of the general formula $$-SO_2CH_2CHA \quad\quad I$$
$$\quad\quad\quad\quad |$$
$$\quad\quad\quad\quad E$$

wherein E is hydrogen or any other desirable substituent and A is an acid grouping, i.e. a grouping which when combined with hydrogen forms an acid or is a salt of said grouping, desirably with an alkali metal. In particular the radical A may be a halogen atom such as chlorine, a sulphate ester group, that is, a group of the formula

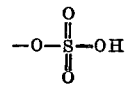

or an alkali metal salt thereof.

Preferably the ultra-violet absorber of the present invention is of the general formula

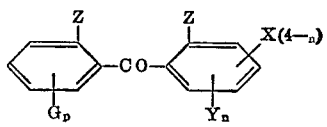

wherein each Y is a sulphone group of the general Formula I, $n$ is an integer which is preferably one, Z is hydrogen or another substituent but at least one Z is a hydroxyl group, each X is hydrogen or another substituent, for example hydroxyl or alkoxy groups, each G is hydrogen or another substituent, for example hydroxyl or alkoxy and $p$ is an integer from 1 to 5. Preferably both Z's are hydroxyl groups.

In a more preferred embodiment of the present invention the ultra-violet absorber is of the general formula

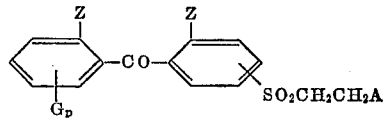

wherein A, Z, G and $p$ are as defined above.

Typical ultra-violet absorbers which may be mentioned are those of the general formula

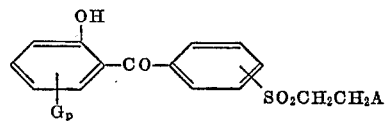

wherein A, G and $p$ are as defined above. Sub-classes of compounds having the general Formula IV which may be mentioned are (1) those having the following general formula

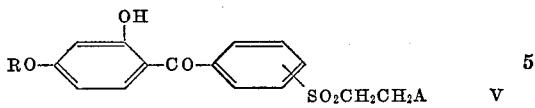     V wherein R is alkyl, particularly a methyl group, (2) those having the following general formula

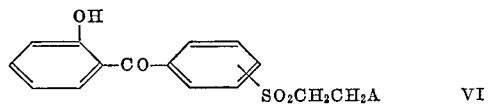     VI wherein A is as defined above. It is desirable however that the ultra-violet absorbers absorb primarily ultra-violet light between 350 m$\mu$ and 400 m$\mu$ and for this purpose it is found that compounds having two hydroxyl groups, ortho to the carbonyl group are particularly preferred. Thus the particularly preferred ultra-violet absorber is one having the formula

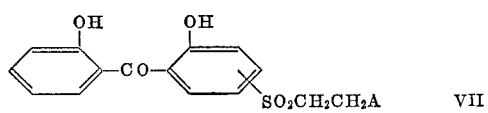     VII wherein A is as defined above.

The ultra violet absorbers of the present invention may be prepared by effecting a Friedel-Crafts reaction between the compound of the general formula

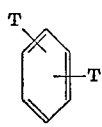     XII wherein each T is hydrogen or a hydroxy or alkoxy group and a compound of the general formula

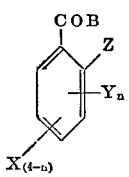     XIII particularly of the general formula

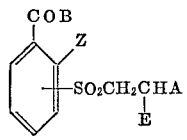     XIV wherein B is a halogen atom, for example chlorine, and Z, X, Y, A, E and $n$ are as defined above, desirably in the presence of aluminium chloride as catalyst. The T groups Formula XII are particularly in the meta positions.

However it is considered that the compounds having the general Formula XIII, as well as the related compounds in which B is replaced by a hydroxyl group, are novel. Thus according to a further embodiment of the present invention there is provided a benzoyl derivative having the general formula

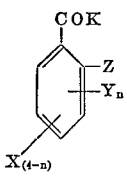     XV particularly of the general formula

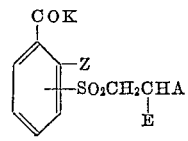     XVI wherein K is hydroxyl or halogen, for example chlorine and the other symbols are as defined above. The compounds having the general Formula XVI are intermediates in the production of the ultra-violet absorbers of the present invention.

Compounds having the general Formula XVI wherein K is hydroxyl and Z is hydrogen may be produced by reacting the corresponding toluene derivatives having the general formula

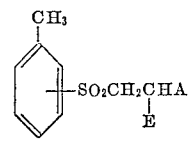     XI wherein A and E are as defined above with an oxodizing agent, for example chromium trioxide.

Compounds having the general Formula XVI wherein K is hydroxyl may be converted into the corresponding compounds wherein K is halogen by reaction with a chlorinating agent. Whilst thionyl chloride may be used as the chlorinating agent when Z is hydrogen, if Z is hydroxyl one must be oxylyl chloride.

Also compounds of general Formula XV can be prepared by reacting the thiol corresponding to the sulphone required with a haloalkanol to produce a compound of the general formula

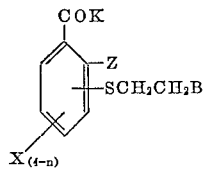     XVII wherein the symbols are as defined above, and reacting this compound with hydrogen peroxide. Compounds of general Formula XVII are also considered to be novel.

The present invention also provides a method of increasing the resistance of a substrate containing reactive hydrogen atoms to degeneration by actinic light which comprises applying to said substrate in the form of an alkaline solution at least one benzophenone ultra-violet absorber of the present invention for a time and at a temperature sufficient to effect linkage between the substrate and the benzophenone compound.

It is believed that the linkage takes place by means of the elimination of acid from the sulphone group thereby forming a vinyl group which then links with the reactive hydrogen atom on the substrate. It is preferred that the pH of the alkaline solution is at least 10. Whilst the temperature is at least 60° C. with a time of upwards of 15 minutes is sufficient it is preferred to use a temperature of at least 36° C. for at least 2 hours to effect the linking between the benzophenone and the substrate.

The substrate to which the ultra-violet absorbers of the present invention is applied to obtain resistance to degradation by means of actinic light, i.e. phototendering must contain reactive hydrogen atoms and preferably the substrate is a cellulosic material in particular a cellulosic textile material such as cotton. The substrate is desirably in fibrous form which may be unwoven, non-woven or of knitted form or may be in the form of filaments.

The amounts of benzophenone ultra-violet absorber generally considered sufficient to produce effect on the substrate is of the order of from 1 to 2% by weight of the dried substrate.

The present invention will be illustrated by, but is in no manner limited to, the following examples.

In the examples, Example I illustrates the intermediates of general Formulae XV and XVI, Examples 2, 3 and 4 illustrate the intermediates of general Formulae XIII and XIV, Examples 5 to 9 illustrate the compounds of general Formula II and Examples 10 to 12 illustrate use of the compounds of general Formula II.

EXAMPLE 1

Preparation of 5-(beta-chloroethylthio)-2-hydroxybenzoic acid

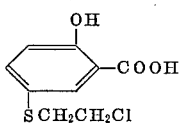

5-thiol-2-hydroxybenzoic acid (25 g. prepared as in J.C.S., (1922) 121, 2559) was dissolved in ethanol (100 ml.) containing sodium (8 gms.). 2-chloroethanol (9.8 g.) was slowly added with stirring and the resulting mixture kept at 55° C. for ½ hour. Concentrated hydrochloric acid (300 ml.) was then added and the solution refluxed for 3 hours. After refluxing, the reaction mixture was poured into 3 litres of water and left overnight. Filtration of this solution gave a solid which crystallised from 100–120 petroleum ether as white prisms (M.P. 151°–152° C.). Found: C, 46.6; H, 3.9; Cl, 15.1; O, 20.3; S, 13.7. $C_9H_9ClO_3S$ requires C, 46.4; H, 3.9; Cl, 15.3; O, 20.6; S, 13.7%.

The infrared spectrum contained a peak at 1650 cm.$^{-1}$ (chelated C=O).

EXAMPLE 2

Preparation of 5-(beta-chloroethylsulphonyl)-2-hydroxybenzoic acid

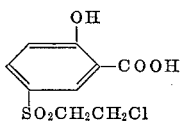

5-(beta-chloroethylthio)-2-hydroxybenzoic acid (20 g.) was dissolved in glacial acetic acid (200 ml.) and refluxed gently whilst a solution of hydrogen peroxide (100 volumes, 300 ml.) was slowly added. The reaction mixture was refluxed for a further 3 hours and then poured into water (3 litres). Evaporation of this solution in a rotary evaporator at 40° C. gave yellow powder which after recrystallisation from toluene/100–120° petroleum ether (1/1) formed small white needles (M.P. 163°–164°). Found: C, 40.4; H, 3.5; Cl. 13.0; O, 30.2; S, 12.0. $C_9H_9ClO_5S$ requires C, 40.7; H, 3.4; Cl, 13.3; O, 30.3; S, 12.1%.

The infrared spectrum contained bands at 1650 (chelated carbonyl) 1280 and 1140 cm.$^{-1}$

EXAMPLE 3

Preparation of 5-(beta-chloroethylsulphonyl)-2-hydroxybenzoyl chloride

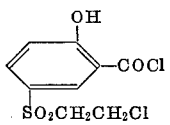

5-(beta - chloroethylsulphonyl)-2-hydroxybenzoic acid (13.2 g.) was suspended in benzene and oxalyl chloride (14 g.) added dropwise. The reaction mixture was warmed gently to start the reaction, and then refluxed for 3 hours. At the end of this time benzene and excess oxalyl chloride were distilled off under reduced pressure, and the brown glassy solid which remained was dissolved in ethyl acetate and precipitated with 80/100° petroleum ether. The product was obtained as pale yellow prisms (M.P. 87°–88° C.).

The infrared spectrum contained a band at 1750 cm.$^{-1}$ (C=O).

EXAMPLE 4

Preparation of p(beta-chloroethylsulphonyl) benzoic acid

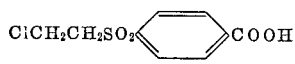

p-(Beta-chloroethylsulphonyl)toluene (72 g.) prepared as described in J. Org. Chem., 15, 824 (1950) was dissolved in glacial acetic acid (700 g.), and concentrated sulphuric acid (85 ml.) was added slowly with stirring.

The solution was cooled to room temperature and chromium trioxide (100 g.) added in small portions with stirring, the temperature being kept below 50° C. After the addition was complete the reaction mixture was stirred for a further ten minutes and then poured into ice/water to give a final volume of 5 to 6 litres. The precipitate was filtered, washed with water until colourless, and recrystallised from ethanol/water (1/1) to give white prisms (M.P. 227 to 228° C.). Found: C, 43.3; H, 3.6; S, 12.1; O, 26.0; Cl, 14.3. $C_9H_9ClO_4S$ requires C, 43.3; H, 3.3; S, 12.1; O, 26.3; Cl, 14.5%.

The infrared spectrum showed strong bands at 1700

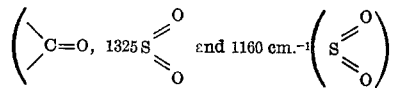

This compound was converted into the corresponding acid chloride i.e. p-(beta-chloroethylsulphonyl)benzoyl chloride, by refluxing for half an hour with an excess of thionyl chloride and 1 drop of pyridine. When the surplus thionyl chloride was removed by distillation under reduced pressure the acid chloride remained as white needles (M.P. 97°–98°).

The infrared spectrum of this compound showed strong bands at 1780, 1750 (C=O), 1325, and 1160 cm.$^{-1}$

EXAMPLE 5

Preparation of 5-(beta-chloroethylsulphonyl)-2-hydroxybenzophenone

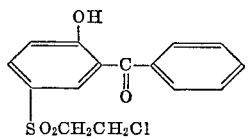

5-(beta - chloroethylsulphonyl)-2-hydroxybenzoyl chloride (5 g.) was dissolved in benzene (50 ml.) and stirred whilst aluminium chloride (2.7 g.) was slowly added, the temperature being kept below 25° C. The procedure of Example 2 was then followed, final crystallisation being carried out from ethanol. The product crystallised as very pale yellow needles (M.P. 150° to 151° C.). Found: C, 55.4; H, 4.0; Cl, 10.9; O, 19.9; S, 9.8. $C_{15}H_{13}ClO_4S$ requires C, 55.4; H, 4.0; Cl, 10.9; O, 19.7; S, 9.8%.

Infrared spectrum contained bands at 1610 (C=O), 1280 and 1140 cm.$^{-1}$

EXAMPLE 6

Preparation of 2,4-dihydroxy-4'-(beta-chloroethylsulphonyl)benzophenone

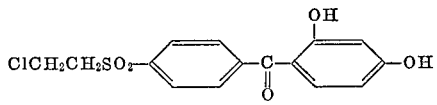

p-(Beta-chloroethylsulphonyl)benzoyl chloride (13 g.) and resorcinol (15 g.) were stirred together in chlorobenzene (150 ml.) and aluminium chloride (6 g.) was added in small quantities, the temperature of the reaction mixture being kept below 25° C. The mixture was stirred for two hours at room temperature, heated at 80° C. for a further two hours, left overnight, and poured into ice containing a little hydrochloric acid. Chlorobenzene was removed by steam distillation and after cooling the residual gum was collected. Several crystallisations from ethanol/water (1/1) gave the product as very pale yellow prisms (M.P. 146°–147° C.). Found: C, 52.3; H, 3.8; Cl, 10.4; O, 24.1; S, 9.4. $C_{15}H_{13}ClO_5S$ requires C, 52.9; H, 3.8; Cl, 10.4; O, 23.5; S, 9.4%.

UV spectrum:
$\lambda$ max. 298, 328 m$\mu$

There were strong bands in the infrared at 3360 (OH), 1625 (C=O), 1320, and 1140 cm.$^{-1}$

EXAMPLE 7

Preparation of 2-hydroxy-4-methoxy-4'-(beta-chloroethyl-sulphonyl)-benzophenone

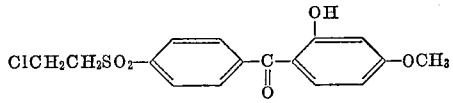

p-(Beta-chloroethylsulphonyl)benzoyl chloride (10 g.) and dimethoxybenzene (13.8 g.) were stirred together in chlorobenzene (150 ml.) and powdered aluminium chloride (6 g.) added in small quantities, the temperature of the reaction mixture being kept below 25° C. The procedure of Example 2 was then followed, the final crystallisations being carried out from dimethyl-formamide/water (1/1). The product formed very pale yellow prisms (M.P. 125°–126° C.). Found: C, 54.2; H, 4.2; Cl, 9.9; O, 22.6; S, 9.0. $C_{16}H_{15}ClO_5S$ requires C, 54.1; H, 4.1; Cl, 9.8; O, 22.7; S, 9.0.

UV spectrum:
$\lambda$ max. 294, 330 m$\mu$
$\lambda$ min. 268 m$\mu$

There were strong bands in the infrared at 1620, 1600 (C=O), 1330, and 1150 cm.$^{-1}$

EXAMPLE 8

Preparation of 5-(beta-chloroethylsulphonyl)-2-hydroxy-4'-methoxy-benzophenone

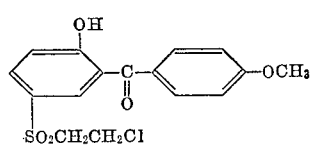

5-(beta - cholroethylsulphonyl)-2-hydroxybenzoyl chloride (5 g.) was dissolved in anisole (5 ml.), and stirred whilst aluminium chloride (0.27 g.) was slowly added, the temperature being kept below 25° C. The procedure of Example 2 was then followed, final crystallisation being carried out from ethanol. The product crystallised as pale yellow needles. (M.P. 154°–155° C.)

EXAMPLE 9

Preparation of 5-(beta-chloroethylsulphonyl)-2,2'-dihydroxy-4-methoxybenzophenone

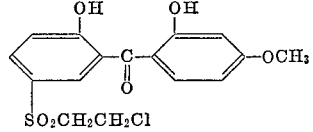

5-(beta - chloroethylsulphonyl)-2-hydroxybenzoyl chloride (5 g.) was suspended in chlorobenzene (50 ml.) and dimethoxybenzene (3 g.). Aluminium chloride (4.5 g.) was slowly added, the temperature being kept below 25° C. The procedure of Example 2 was then followed and the product, after crystallisation from 100/120° petrol ether, was obtained as pale yellow prisms (M.P. 105°–106° C.). Found: C, 51.0; H, 4.0; Cl, 9.5; O, 25.9; S, 8.7. $C_{16}M_{15}ClO_6S$ requires C, 51.2; M, 4.0; Cl, 9.6; O, 26.0; S, 8.6%).

EXAMPLE 10

Application of the absorbers to cotton cloth was carried out as follows:

Cloth samples were treated at a liquor ratio of 10:1 with a quantity of absorber equal to 1.3 times the amount theoretically needed to treat the cloth to the concentration required (e.g. to treat 100 g. cloth at 1%, 1.3 g. of absorber were used).

The solution also contains: sodium chloride (50 g./l.), trisodium orthophosphate (25 g./l.), and 32% caustic soda solution (1.5 g./l.).

The solution was heated either at 60° C. for ¼ hour or preferably at 35°–40° C. for 2 hours.

The samples were then removed and washed twice in solutions containing sodium carbonate (5%) and industrial soap (2%) at 90° C. for 10 minutes, rinsed and air dried.

EXAMPLE 11

Samples of cloth treated with the above absorbers were exposed to a Xenotest lamp for 150 hours. Untreated cotton samples were treated at the same time. The degree of tendering of the fabrics was estimated by determining the fluidities of the samples dissolved in cuprammonium hydroxide solution.

| Absorber used: | Fluidity increase, poise$^{-1}$ |
|---|---|
| None | 6 |
| 1.5% Example 2 | 5.9 |
| 1.5% Example 3 | 3.0 |
| 1.5% Example 7 | 2.0 |
| 1.5% Example 8 | 3.1 |
| 1.5% Example 9 | 2.0 |

EXAMPLE 12

Samples of cloth treated with the absorber 2-hydroxy-4-methoxy-4'-(beta - chloroethylsulphonyl)benzophenone were exposed to sunlight at Didsbury, Manchester, and at Didcot. The strength losses of the fabrics were determined with a "Goodbrand" strength tester.

| Manchester | | | Didcot | | |
|---|---|---|---|---|---|
| Concentration of absorber | Time of exposure (month) | Strength loss (percent) | Concentration of absorber | Time of exposure (month) | Strength loss (percent) |
| 1.5% | 1 | 2.8 | 1.5% | 1 | 7.1 |
| | 2 | 12.8 | | 2 | 10.0 |
| | 4 | 32.0 | | | |
| 1.0% | 1 | 5.7 | 1.0% | 1 | 4.2 |
| | 2 | 18.4 | | 2 | 11.4 |
| | 4 | 40.0 | | | |
| 0.5% | 1 | 9.2 | 0.5% | 1 | 5.7 |
| | 2 | 29.0 | | 2 | 15.0 |
| | 4 | 43.0 | | | |
| Control | 1 | 13.5 | Control | 1 | 19.9 |
| | 2 | 37.8 | | 2 | 34.0 |
| | 4 | 53.3 | | | |

We claim:
1. A benzophenone compound of the formula

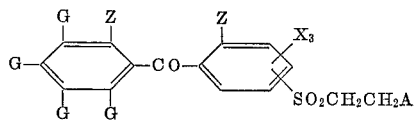

wherein A is halogen, a sulphate ester of the formula

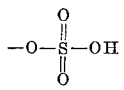

or an alkali metal salt of said sulphate ester;
X is hydrogen, hydroxyl or methoxy;
Z is hydroxyl or hydrogen and at least one Z is hydroxyl; and
G is hydrogen, hydroxyl or methoxy.

2. A benzophenone compound as defined in claim 1 wherein A is chlorine.
3. A benzophenone compound as defined in claim 1 wherein Z is hydroxyl.
4. A benzophenone compound as defined in claim 1 wherein one Z is hydrogen.
5. A benzophenone compound as defined in claim 1 wherein one G is methoxy.
6. A benzophenone compound as defined in claim 1 wherein X is hydrogen.
7. 5-(beta-chloroethylsulphonyl) - 2 - hydroxybenzophenone.
8. 2,4-dihydroxy - 4' - (beta-chloroethylsulphonyl)-benzophenone.
9. 2-hydroxy - 4 - methoxy - 4' - (beta-chloroethylsulphonyl)-benzophenone.
10. 5-(beta - chloroethylsulphonyl) - 2 - hydroxy-4'-methoxy-benzophenone.
11. 5-(beta-chloroethylsulphonyl) - 2,2' - dihydroxy-4-methoxy-benzophenone.

References Cited

UNITED STATES PATENTS 2,419,553    4/1947    Houtman _____ 260—591

FLOYD D. HIGEL, *Primary Examiner.*

U.S. Cl. X.R.

8—116.4, 129; 106—187; 117—144; 252—406; 260—458, 544, 521, 524, 516, 515